(12) United States Patent
Zhou et al.

(10) Patent No.: US 7,203,774 B1
(45) Date of Patent: Apr. 10, 2007

(54) BUS SPECIFIC DEVICE ENUMERATION SYSTEM AND METHOD

(75) Inventors: Shudong Zhou, Fremont, CA (US); John Danielson, San Francisco, CA (US); Jerry A. Gilliam, Santa Clara, CA (US); David A. Butterfield, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 665 days.

(21) Appl. No.: 10/449,302

(22) Filed: May 29, 2003

(51) Int. Cl.
*G06F 3/00* (2006.01)
*G06F 9/44* (2006.01)
*G06F 15/177* (2006.01)

(52) U.S. Cl. .................... 710/17; 719/319; 719/327
(58) Field of Classification Search ........ 710/305–315, 710/10, 15–19; 717/168–178; 719/321–327; 709/220–224
See application file for complete search history.

(56) References Cited

U.S. PATENT DOCUMENTS

| | | | |
|---|---|---|---|
| 6,047,332 A * | 4/2000 | Viswanathan et al. ...... 709/245 |
| 6,449,715 B1 * | 9/2002 | Krivoshein .................... 713/1 |
| 6,877,018 B2 * | 4/2005 | Oshins et al. ................ 707/206 |
| 6,934,774 B1 * | 8/2005 | Sundaram et al. ............ 710/19 |
| 2003/0233487 A1 * | 12/2003 | Ruget et al. ................ 709/321 |
| 2004/0022254 A1 * | 2/2004 | Pathak et al. ............... 370/396 |
| 2004/0225764 A1 * | 11/2004 | Pooni et al. .................. 710/38 |

* cited by examiner

Primary Examiner—Meng-Al T. An
Assistant Examiner—Charles Anya
(74) Attorney, Agent, or Firm—Martine Penilla & Gencarella, LLP

(57) ABSTRACT

A kernel device file system publication system for dynamically enumerating and configuring an instance of a device in the kernel device tree upon request by a user level application. The kernel device file system logically arranges system level devices in a hierarchical tree-like topology defining devices as nodes of a device tree to allow for a top-down access. The top-down access allows devices connecting to the computer system to be configured based on the physical path of the device. This process starts at a bus nexus and drives device configuration down the device tree. The bus configuration interfaces permit each nexus in the device tree hierarchy to participate in the device lookup and readdirs operations performed by the device file system. The device file system path operations are performed as an iterative sequence of bus configure operations, whereby each nexus controls the enumeration and configuration of that nexus' children.

26 Claims, 8 Drawing Sheets

BUS SPECIFIC DEVICE ENUMERATION SYSTEM AND METHOD

FIELD OF THE INVENTION

The present claimed invention relates generally to the field of computer operating systems. More particularly, embodiments of the present claimed invention relate to a system for auto-configuring devices dynamically on behalf of user level applications.

BACKGROUND ART

A computer system can be generally divided into four components: the hardware, the operating system, the application programs and the users. The hardware (e.g., central processing unit (CPU), memory and input/output (I/O) devices) provides the basic computing resources. The application programs (e.g., database systems, games business programs (database systems, etc.) define the ways in which these resources are used to solve computing problems. The operating system controls and coordinates the use of the hardware resources among the various application programs for the various users. In doing so, one goal of the operating system is to make the computer system convenient to use. A secondary goal is to use the hardware in an efficient manner.

The Unix operating system is one example of an operating system that is currently used by many enterprise computer systems. Unix was designed to be a time-sharing system, with a hierarchical file system, which supported multiple processes. A process is the execution of a program and consists of a pattern of bytes that the CPU interprets as machine instructions (text), data and stack. A stack defines a set of hardware registers or a reserved amount of main memory that is used for arithmetic calculations.

The Unix operating system consists of two separable parts: the "kernel" and the "system programs." Systems programs consist of system libraries, compilers, interpreters, shells and other such programs that provide useful functions to the user. The kernel is the central controlling program that provides basic system facilities. The Unix kernel creates and manages processes, provides functions to access file-systems, and supplies communications facilities.

The Unix kernel is the only part of Unix that a user cannot replace. The kernel also provides file system, CPU scheduling, memory management and other operating-system functions by responding to "system-calls." Conceptually, the kernel is situated between the hardware and the users. System calls are used by the programmer to communicate with the kernel to extract computer resource information. The robustness of the Unix kernel allows system hardware and software to be dynamically configured to the operating system while applications programs are actively functional without having to shut-down the underlying computer system.

Thus, when system hardware or software resource changes are implemented in a computer system having the Unix operating system, the kernel is typically configured or reconfigured to recognize the changes. These changes are then made available to user applications in the computer system. The Unix operating system is a robust software that allows network devices to be dynamically connected to the network without having to shut down existing devices on the network. Device auto-configuration is the process by which the kernel loads and attaches device drivers to the devices connecting to the network. Certain kernel implementations perform device auto-configuration on a per-driver basis, i.e., for each driver, all instances of the driver are attached in a single request. This is often referred to as a "bottom-up" loading.

In contrast, other kernel implementations configure devices in a branch of the device tree based on the physical bus slot to which the hardware is connected. This process starts at a bus nexus and drives configuration down the device tree. This process is referred to as a "top-down" loading. Much of the complexity in the Unix operating system I/O framework is related to making dynamic reconfiguration ("top-down" loading) co-operate with device auto-configuration ("bottom-up" loading).

FIG. 1 is a block diagram illustration of an exemplary prior art computer system 100. The computer system 100 is connected to an external storage device 180 and to an external drive device 120 through which computer programs can be loaded into computer system 100. The external storage device 180 and external drive 120 are connected to the computer system 100 through respective bus lines. The computer system 100 further includes main memory 130 and processor 110. The drive 120 can be a computer program product reader such a floppy disk drive, an optical scanner, a CD-ROM device, etc.

FIG. 1 additionally shows memory 130 including a kernel level memory 140. Memory 130 can be virtual memory which is mapped onto physical memory including RAM or a hard drive, for example. During process execution, a programmer programs data structures in the memory at the kernel level memory 140. User applications 160A and 160B are coupled to the computer system 100 to utilize the kernel memory 140 and other system resources in the computer system 100. In the computer system 100 shown in FIG. 1, when kernel events occur, each of the applications 160A and 160B have to independently perform configuration and/or re-configuration operations to become aware of these events. Furthermore, each application has to initiate system calls to the kernel 140 to extract information on a particular device connected to the network.

This typically results in the applications blocking or waiting for the kernel 140 to extract event information. Having the applications 160A and 160B independently issue system calls to the kernel to extract kernel event information further requires the applications to always preempt the kernel to extract event information. This can be inefficient, time consuming and costly. It may also require the applications to terminate or suspend other processes while preempting the kernel to extract kernel event information.

FIG. 2 is a prior art illustration of a computer network having a CPU 110, a bus driver 210, a network driver 220 and memory 140. The network 200 further includes interface devices 230 and 240 that enables SCSI and USB hardware devices and disks to connect to the network 200. The network interface card 220 enables remote devices Resrc 1–N to connect to the network 200.

In the example shown in FIG. 2, the network devices Resrc 1–N and the hardware devices and disks comprise the device tree of the network 200 and each of the devices and disks connect to the network 200 by a single request when the network is activated and the devices are physically connected to the network. The devices are represented in the prior art kernel by a tree of device information nodes, commonly referred to as the kernel device tree. For hardware devices, a parent-child relationship in the device tree often represents a physical topology of how devices are connected.

In traditional Unix systems, such as the Solaris™, the kernel relies on firmware and configuration files (e.g., a registry) to drive device enumeration in the device tree. Firmware enumeration is slow and configuration files are difficult to be kept in synchronization with other hardware configurations. As devices are added to the network 200, all instances of the device are attached per a single request. When this process is pictured in the kernel device tree with leaf nodes on the bottom, the configuration process starts with leaf nodes at the bottom of the tree and percolates upwards.

Usage of resources provided by a device by a user application requires the underlying operating system of the computer system to know all instances of devices for that driver to be able to access the device. As the network expands and more devices are added to it, the requirement of the prior art device configuration illustrated in FIG. 2 becomes cumbersome and difficult to manage as both users and system administrators have to continuously know all the instances of a device attached to the network to be able to access the device. The prior art system shown in FIG. 2, further requires a manual configuration of devices being added to the network subsequent to the computer system boot-up operation.

Furthermore, device configuration in the prior art system shown in FIG. 2 utilizes standard configuration tools for gathering information on the kernel device configuration. These tools rely on a device information snapshot which is a copy of the actual kernel device tree. One problem with these tools is that device information is unavailable if the device driver is not attached to the device. This is typically indicated by a "driver not attached" error message. This problem is not very serious under a bottom-up loading scheme where all instances are attached if at least one driver instance is in use. Typically, a system will use at least one disk and one network interface resulting in all disks and network interfaces (bound to the same driver) to remain attached. Thus, in the prior art network shown in FIG. 2, the user may erroneously be provided with device information on the network even if the requested device is not attached. This can result in network slow-down if a host of detached devices are requested by the application programs and those device do not exist, but still appear to the user as being connected.

SUMMARY OF INVENTION

Accordingly, to take advantage of the diversity of devices and networks available and the increasing number of new applications being developed, a system is needed that allows a user to access devices without unduely tasking a computer system kernel to monitor device access and configurations to a computer network system. A system is further needed to publish the occurrence of the availability of such devices to user level applications without disrupting the functionality of the kernel for other applications. Further, a need exists to automatically configure devices using a top-down approach that requires a user application to only specify a device name without having to specify the physical location of the device in order to access the device.

What is described herein is a computer system having a plurality of buses and device bus drivers and an operating system kernel structure that provides a file-system like device discovery structure to user level applications by using the name of the device to implement a top-down device access. Embodiments of the present invention allow programmers to add devices to a computer network without having to provide all instances of the device at the time the device is added to the underlying kernel of the operating system supporting the network. Embodiments of the present invention allow a device naming system to monitor a kernel to detect the devices that have been configured in the operating system, but passively connected to the underlying network of the computer system.

The device file system further provides users with a number of semantics that allow user level applications to access to specific devices configured by the kernel without using a kernel device number stored in the computer system.

Embodiments of the present invention further include kernel auto-configuration logic that provides a mechanism for automatically configuring devices in a computer system network based on partial device characteristics information submitted by a device access during a configuration process.

Embodiments of the present invention also include a semantics locking module that allows concurrent dynamic reconfiguration operations on different branches of a device tree for event data system logs that dynamically log the kernel events being monitored as they occur.

Embodiments of the present invention further include a device identification module that enables the kernel to invoke a bus entry point of a bus driver to identify the immediate children of devices connected to the bus in the device tree. In the present invention, a device on the entire device tree may be identified by recursively invoking a bus configuration logic at each nexus of the device tree.

Embodiments of the present invention further include a device driver system that identifies and captures driver specific information on all the bus drivers available in the computer system. The bus driver specific information is provided to the device file system to enable a device specific information access and retrieval from the computer network.

Embodiments of the present invention further include a device information module that stores configuration and access information of each device on a particular device driver for a particular bus in the computer system. The device specific information is provided to the device file system during a device access request. The device specific information may be pre-configured or dynamically added to the device information module.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to monitor kernel level access to system level devices and to publish the availability of these devices to requesting user level applications. In accordance with an aspect of the invention, a kernel level device file system monitoring system provides user applications the ability to dynamically access system level devices as they become available for particular applications transparently to the underlying operating system and the other applications running in the computer system.

Figure 1:
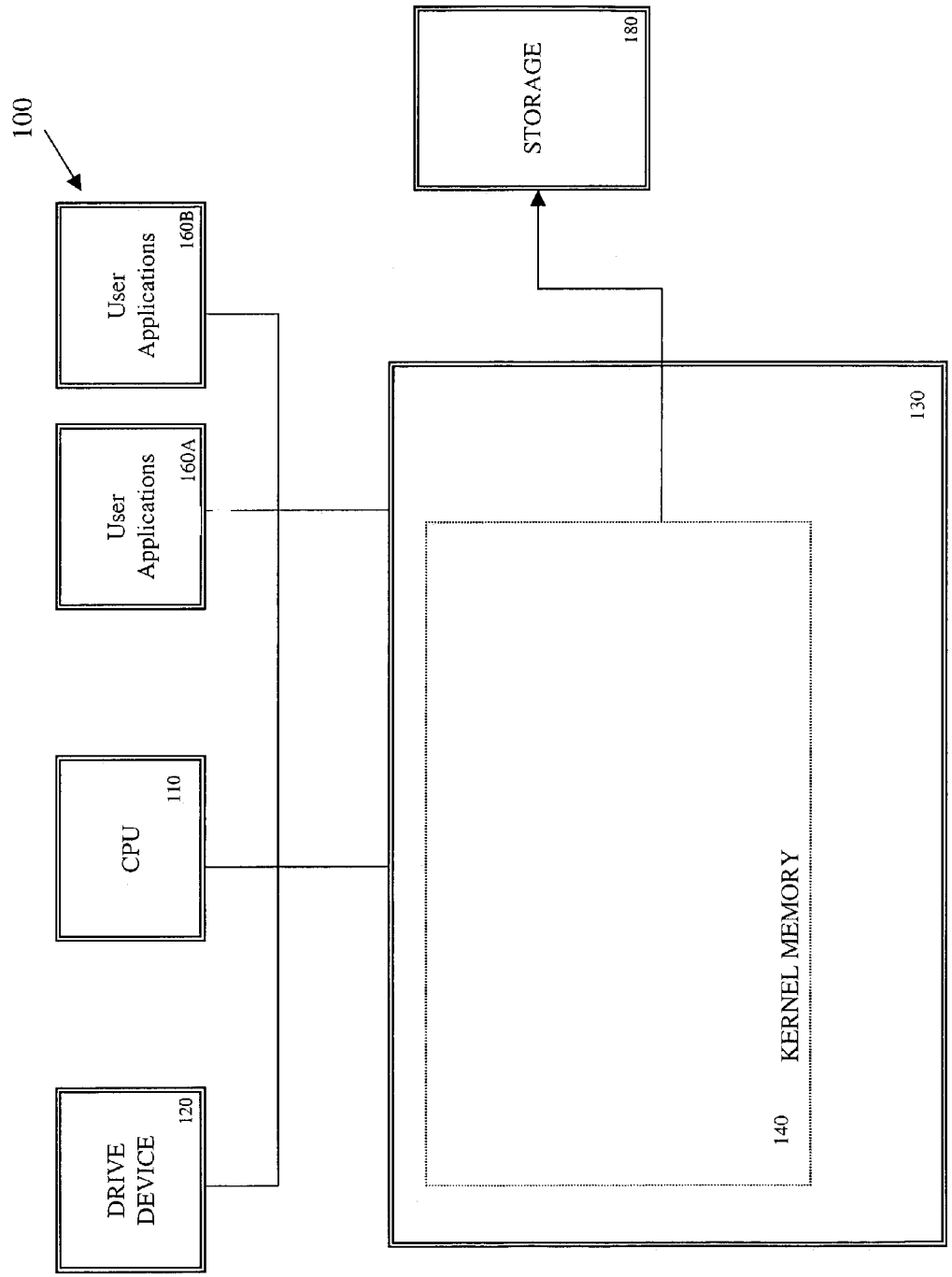
FIG. 1 is a block diagram of a prior art computer system.
Figure 2:
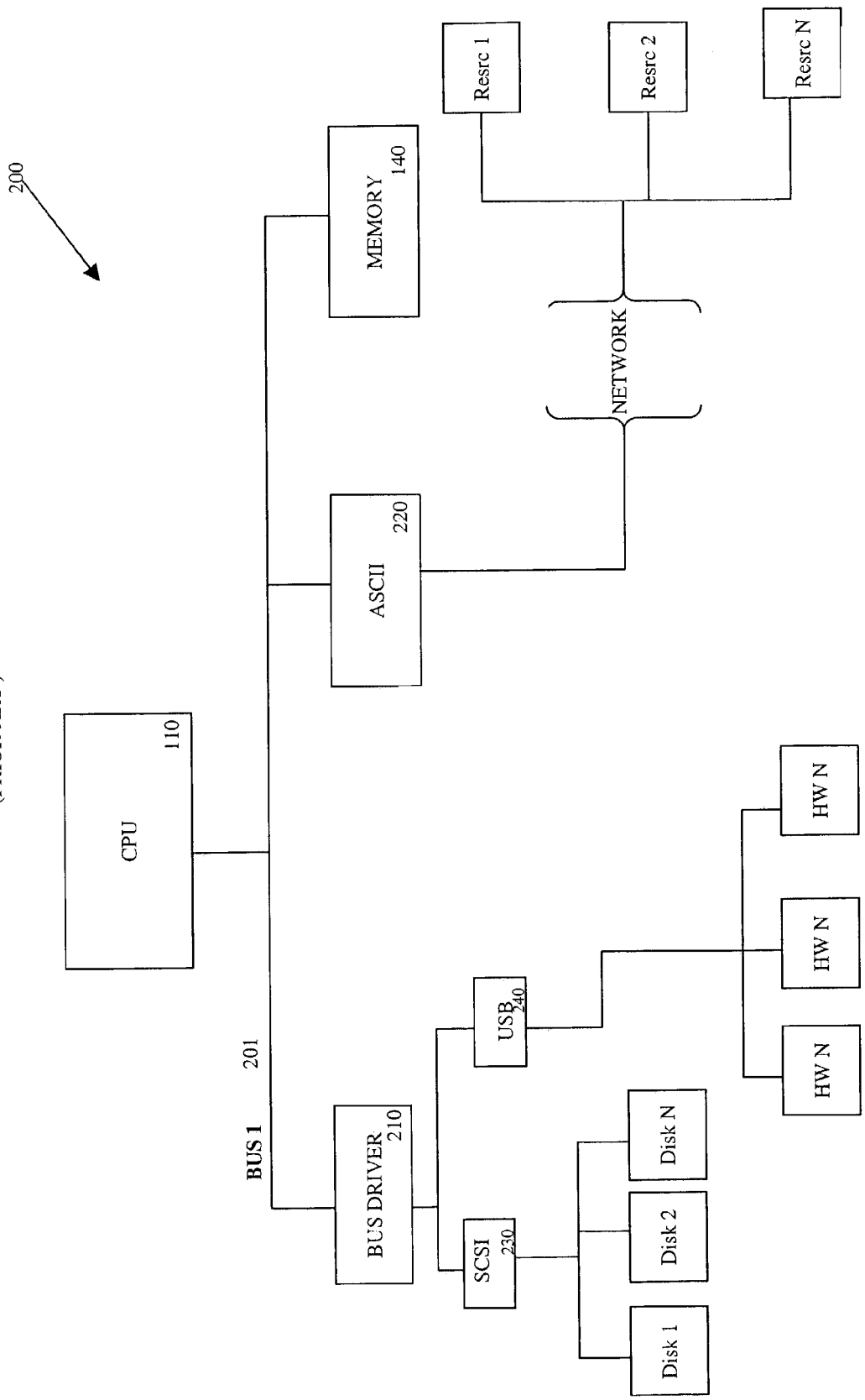
FIG. 2 is a block diagram illustration of a prior art device naming tree in a prior art computer network system.
Figure 3:
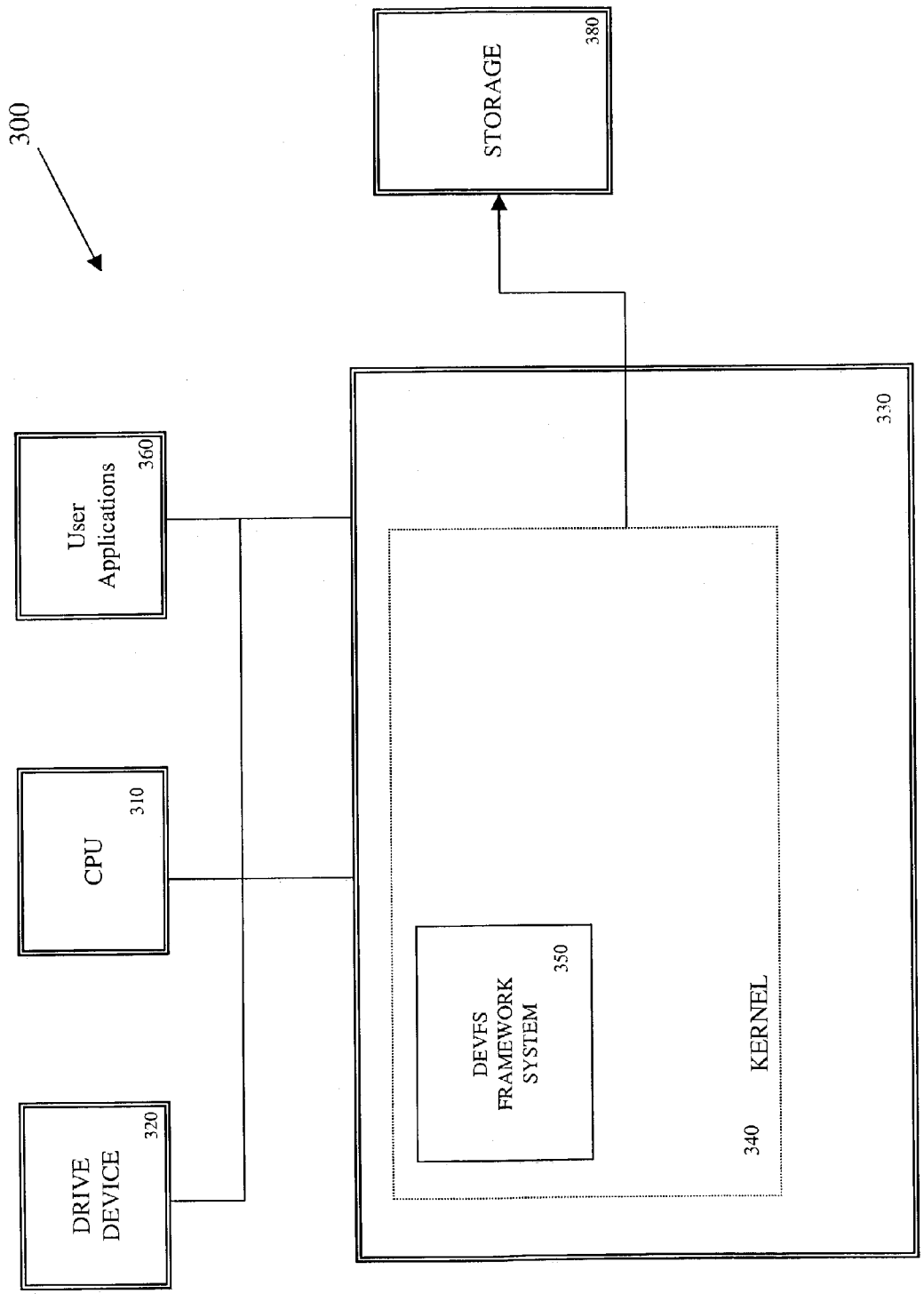
FIG. 3 is a block diagram of a computer system in accordance with an embodiment of the present invention.

FIG. 3 is a block diagram illustration of one embodiment of a computer system 300 of the present invention. The computer system 300 according to the present invention is connected to an external storage device 380 and to an external drive device 320 through which computer programs according to the present invention can be loaded into computer system 300. External storage device 380 and external drive 320 are connected to the computer system 300 through respective bus lines. Computer system 300 further includes main memory 330 and processor 310. Drive 320 can be a computer program product reader such as a floppy disk drive, an optical scanner, a CD-ROM device, etc.

FIG. 3 shows memory 330 including a kernel level memory 340. Memory 330 can be virtual memory which is mapped onto physical memory including RAM or a hard drive, for example, without limitation. During process execution, a programmer programs data structures in the memory at the kernel level memory 340. According to an embodiment of the present invention, the kernel memory level includes a kernel level device configuration system (DEVFS) 350. The DEVFS 350 provides an interface between the kernel and bus drivers in the computer system 300 for device discovery and enumeration. The DEVFS 350 allows the kernel to query for a specific device, a class of devices, or all devices present on a particular bus in the computer system 300.

The DEVFS 350 comprises application interfaces for kernel level publication and applications interfaces for user level applications notification of devices available to the user in a computer network by activating the device and placing the device path-name in the computer system's naming space for subsequent application accesses. The DEVFS 350 provides a unified approach of device reconfiguration and device configuration. The DEVFS 350 also improves device tree locking and scalability and a better handling of the input/output architecture of the kernel 340.

Figure 4:
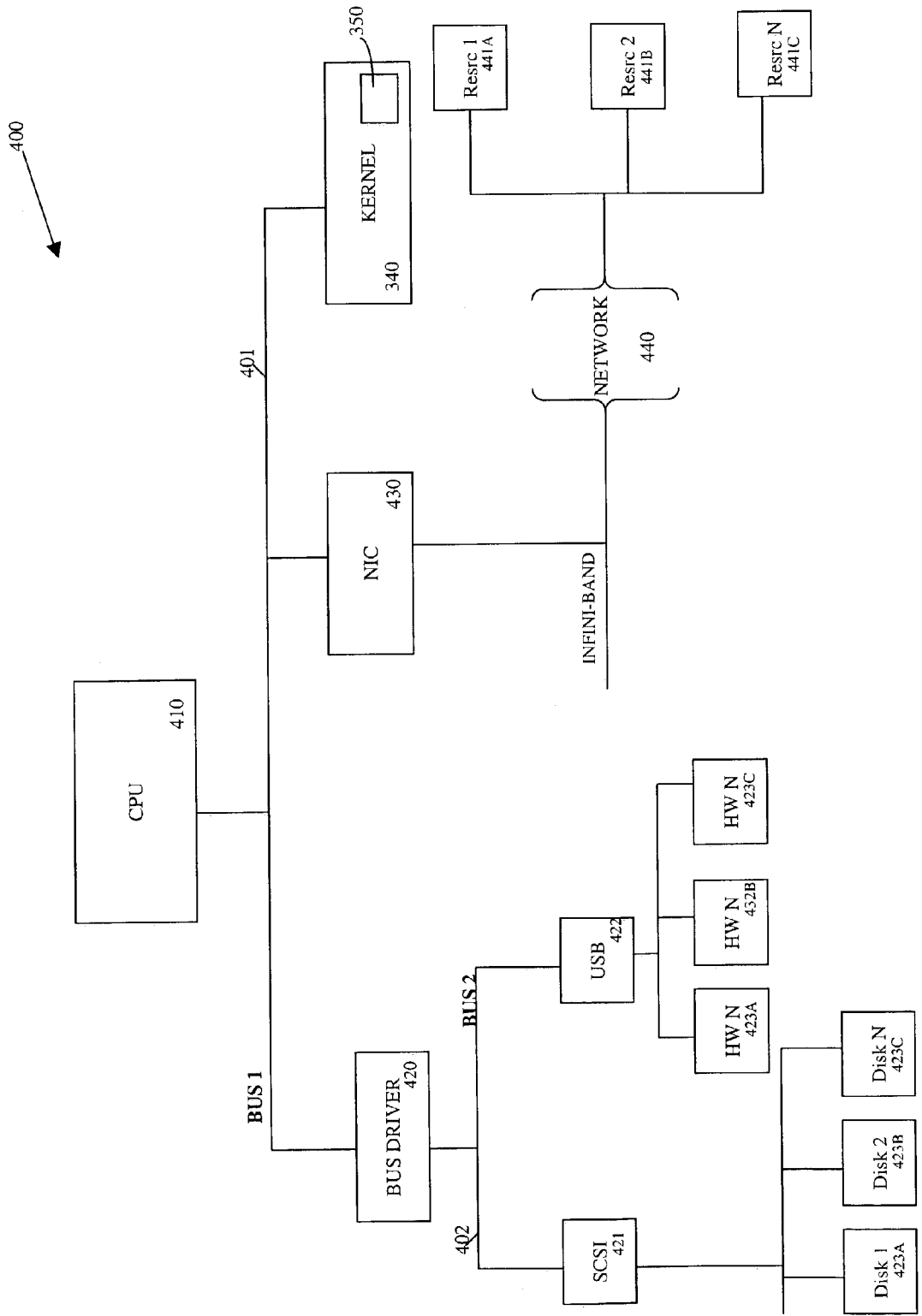
FIG. 4 is a block diagram illustration of one embodiment of a device naming tree in a computer network system of the present invention.

FIG. 4 is a block diagram illustration of one embodiment of a computer network environment 400 implementation of the DEVFS 350 of the present invention. As shown in FIG. 4, the computer system network 400 comprises a central processing unit (CPU) 410, a high speed bus 401, bus driver 420, network device driver 430, kernel 340, DEVFS 350, proprietary bus 402, SCSI device driver 421, SCSI devices 424A–424C, USB device driver 422, USB devices 423A–423C, network 440 and network devices 441A–441C. The DEVFS 350 provides device to user applications by hierarchically arranging device access entry points from the kernel through the main system bus driver down to the individual proprietary bus drivers in the network, then to the individual device drivers down to the individual devices. Devices in the kernel 340 are represented by a tree of device information nodes, referred to as a kernel device tree. For hardware devices, a parent-children relationship in the device tree represents the physical topology of how the devices are connected.

The DEVFS 350 interacts directly with the kernel 340 operating system and the device drivers 421, 422 and 430 to hierarchically partition devices coupled to buses 401 and 402. Applications requesting access to specific devices only interact with the DEVFS 350 to gain access to the requested device. In one embodiment of the present invention, devices are passively coupled to the network 440 during a system boot operation via the various device drivers (e.g., 421, 422 and 430).

As applications request specific devices on the network 440, the devices are activated and become available for subsequent applications requests. In the example shown in FIG. 4, the DEVFS 350 is not required to know the different standards and characteristics of devices coupled to the computer system and the network 440 as a whole. As devices are coupled to the network 440, the devices are configured by the specific drivers 421, 422 and 430. Device information in each driver is only made available to the DEVFS 350 upon an application request to a specific device.

In one embodiment of the present invention, a bus driver may chose its own method of discovery, such as probing hardware registers, sending a bus request, or contacting a service over a network. Once a device is discovered, the bus driver may take different actions depending on the device class. If a new device is discovered, the bus driver typically creates a new device already known by the kernel and the bus driver. The bus driver then adds a new path to the device object. The DEVFS 350 enables a programmer to access devices passively connected to a computer network via the underlying kernel's operating system and in the process activates the device to applications subsequently requesting access to these devices.

Figure 5:
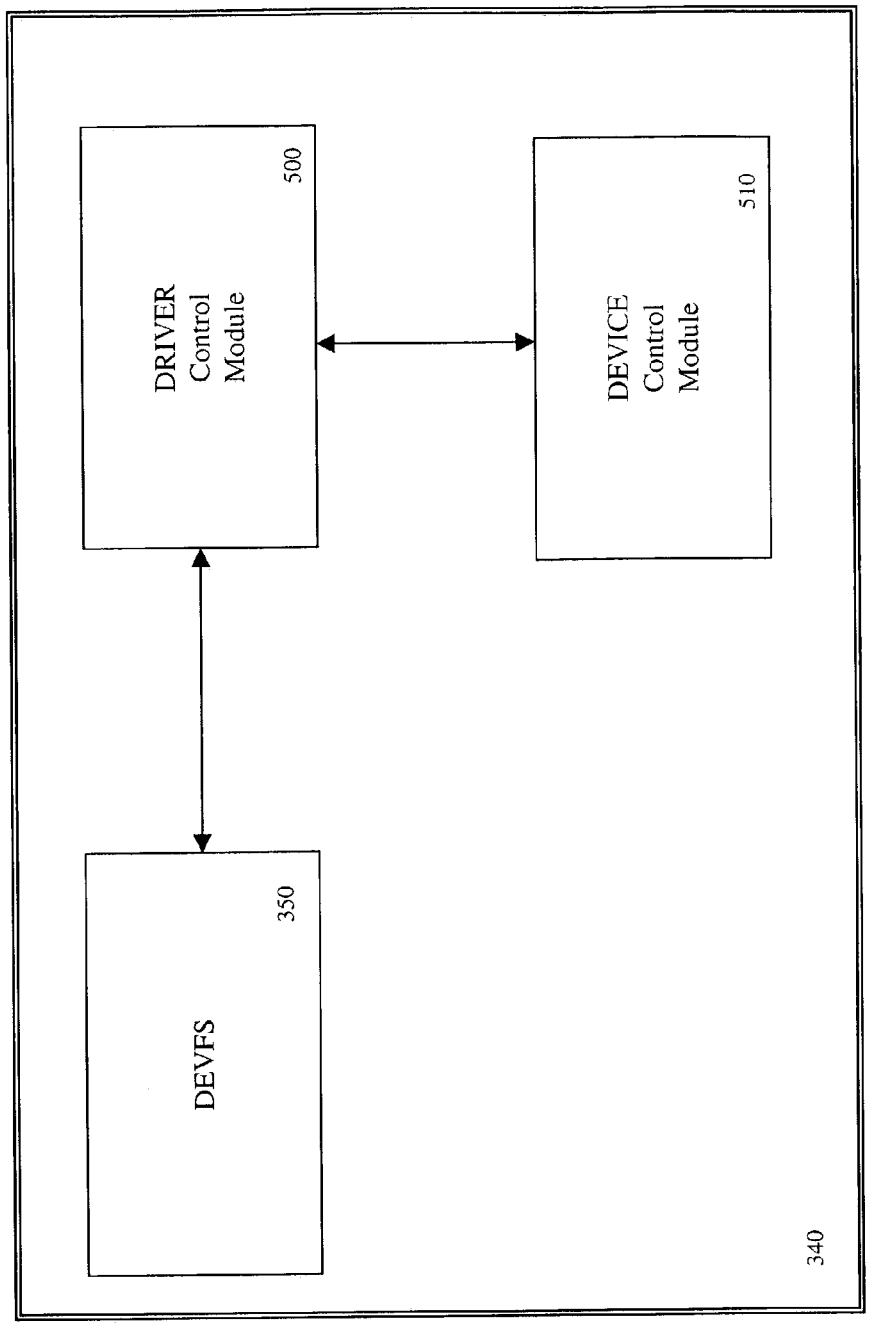
FIG. 5 is a block diagram of an embodiment of the logical blocks of a kernel device in accordance with the present invention.

FIG. 5 is an exemplary block diagram illustration of one embodiment of the logical components of an embodiment of the kernel 340 of the present invention. As shown in FIG. 5, the kernel 340 may logically comprise DEVFS 350, a driver control module 500 and a device control module 510. In operation, the DEVFS 350 decodes device requests received by the kernel 340 from the underlying operating system based on the naming space logic of the kernel 340. In one embodiment of the present invention, the kernel 340 further includes a driver hierarchy that mirrors the hardware devices configured in the computer system or network.

Decoded device names are presented to the driver control module 500 to determine the particular bus driver in the computer network that a particular device may be coupled. The driver control module 500 maintains information on the main bus 401 (FIG. 4) and the secondary buses in the computer system. The driver control module 510 controls both the high speed and proprietary bus drivers in the computer system. In one embodiment of the present invention, decoded device names are presented to the device control module 510 by the driver control module 500 to retrieve a specific device from the device tree to the DEVFS 350. The device control module 510 tracks all instances of devices coupled to the computer network and activates those devices requested by the DEVFS 350.

Figure 6:
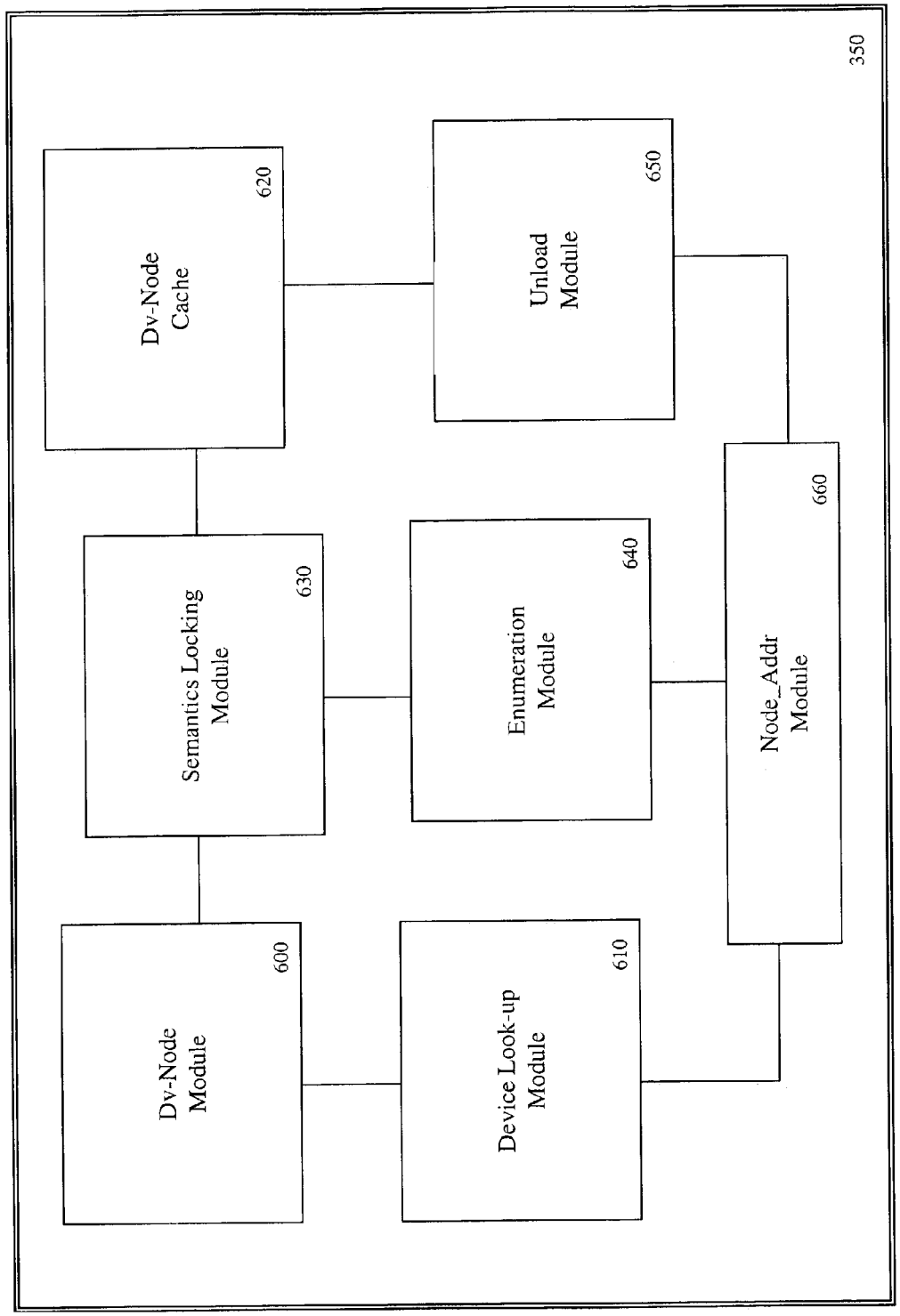
FIG. 6 is a block diagram of one embodiment of an internal architecture of a kernel device file-system auto-configuration system of the present invention.

FIG. 6 is a block diagram illustration of one embodiment of the kernel device file-system module (DEVFS) 350 of the present invention. The DEVFS 350 comprises device node module 600, device lookup module 610, device node cache module 620, locking semantic module 630, device enumeration module 640, device unload module 650 and node address module 660.

The DEVFS 350 file-system exports the entry level device (e.g., /device) physical name spaces. In one embodiment of the present invention, the DEVFS 350 is mounted on /devices and replaces, using identical path names, the set of special files and subdirectories currently maintained by the kernel's device file-system administration utility files under the /devices directory in the root file system. A primary function of the DEVFS 350 is to associate the device file system lookup operation with a device attachment operation in the device tree. The DEVFS 350 provides a view of the device tree to applications accessing these devices. In one embodiment of the present invention, opening a /device pathname may cause a new node or a hierarchy of new nodes in a parent-child relationship to be created in the device tree.

The device node module 600 is the basic element of the DEVFS 350. The device node module 600 can be a directory or a file. Each directory node device corresponds to a node in the device tree and each file device node corresponds to a minor node associated with a device node information. The device nodes are created as part of a lookup or a read directory operation. In one embodiment of the present invention, there exists at least one device node corresponding to the root node in the device tree. This is created during a boot operation when the DEVFS 350 is first mounted in the computer network 300. The rest of the device nodes are created on-demand.

In one embodiment of the present invention, the DEVFS 350 provides each device node with on-disk persistence for device attributes, ownership, and permissions. The implementation of this persistence mechanism is private. Initially, the DEVFS 350 continues to use the Unix file-system under the /devices mount point in the kernel to implement this persistence.

In one embodiment of the present invention, during the operations of the device node module 600, an initial DEVFS 350 implementation deals with a lookup and a directory read operations related to directory device nodes, device operations associated with file device nodes are passed to the kernel's interface to devices in the network 400. The association with the kernel's devices interface is achieved by a virtual node (vnode) substitution during lookup of leaf device nodes. This means that the most important DEVFS 350 operations are a vop_lookup and a vop_readdir. All other operations are either handled by the specfs or passed to the backing file or directory.

Each device node upon creation contains a reference to a corresponding device information node in the device tree. There is also a reference count on the device information node to prevent the device from detaching. The device node is cached by the device node cache module 620 in memory as long as the device node is being referenced.

In one embodiment of the present invention, as a performance optimization, the device nodes are not removed from memory when the reference count goes down to zero. Instead, un-referenced device nodes are removed when the device is about to be removed or the system is under memory constraints.

The device lookup module 610 provides a device specific lookup for existing directory content for a requested device name by a user application. The device lookup module 610 performs device specific searches of a requested device based on the device name. This is associated with the directories or files holding the device information. The device lookup module 610 also helps in generating additional device nodes in the device tree. The device lookup module 610 further interacts with the kernel 340 to logically map devices to the DEVFS 350. This allows devices dynamically configured in the network after a system boot to be activated based on a request by the DEVFS 350.

In one embodiment of the present invention, if the requested name is found and the device node is a leaf node (e.g., it corresponds to a minor node in the device tree), then a DEVFS 350 node is generated and returned. In another embodiment, if the requested name is found and the device node is not a leaf node (e.g., a directory corresponding to a device information node in the device tree), then the device node itself is returned. On the other hand, if the requested node is not found, a request is made to the device information nexus node of the directory device node to configure a child node with the requested name. If the configuration is successful, a new device node is created. The device node or its counterpart is returned.

Still referring to FIG. 6, the node locking semantics module 630 provides a scalable locking scheme whereby the state and device tree linkage of a device information node is protected by the lock associated with the parent node. This allows the concurrent dynamic reconfiguration on different branches of the device tree. These semantics are also convenient for hot-plugging nexus drivers, where only a single framework lock is required to add or remove a child device. In one embodiment of the present invention, a reference count is associated with each device information node. A non-zero reference count prevents the node from being detached and removed.

The device enumeration module 640 provides a mechanism for the DEVFS 350 to enumerate devices in the device tree. The kernel invokes the bus configuration entry point of the parent nexus driver to enumerate the immediate children of the nexus node. The entire device tree is enumerated by recursively invoking the bus configuration at each layer of the device tree, starting from the root node of the tree. The root node with no parent nexus is created at boot time and remains attached for the life of the kernel. In one embodiment of the present invention, there are three operations for bus configuration:

(1) bus_configure_one—the nexus driver is requested to enumerate and configure a child device information node with a given name@addr, where name@addr matches the corresponding component of the physical pathname. The name of the child device provides a driver binding for that node; the address portion of the child device identifies the specific device under the parent by address. This operation is typically invoked as part of the DEVFS 350 lookup operation;

(2) bus_configure_all—the nexus driver is requested to enumerate and configure all possible child device information nodes. This operation is typically invoked as part of the DEVFS 350 directory read operation. It is also invoked as part of a dynamic reconfiguration operation to configure a branch of the device tree.

(3) bus_configure_driver—the nexus driver is requested to enumerate and configure all immediate child device information nodes bound to a specific driver. This operation is primarily intended to optimize the performance of a driver addition logic where the framework will traverse the device tree and invoke a bus_configure_driver operation for each nexus node.

In one embodiment of the present invention, a driver's bus configuration implementation may rely on the child nodes copied from the [OBP] during a system boot operation, allocate software nodes from specification in the driver's configuration files or allocate self identifying nodes based on bus-specific probing mechanism. If a nexus driver does not implement bus configuration, the framework provides a default routine to enumerate children based on the [OBP] nodes and driver configuration specifications. Typically, only hotplug-capable nexus drivers or drivers for a bus with unique configuration timing requirements need to implement the bus configuration entry point.

The device unload module 650 provides a mechanism for keeping detached drive instances during a driver unloading sequence detached. The detached driver instances are attached later on per a request by a requesting user application.

The node address module 660 provides requests to the device information nexus node of the device node directory to configure all its children. Upon completion, the DEVFS 350 updates the directory content based on the current list of attached children under the nexus. If the nexus node is a host controller, the child device information nodes are placed under a file. Hence the directory will always be empty. If the nexus node is an interface to a network type of bus, it is usually impossible to enumerate all potential devices. In such a case, the directory content is determined by the nexus driver's bus configuration implementation.

Figure 7:
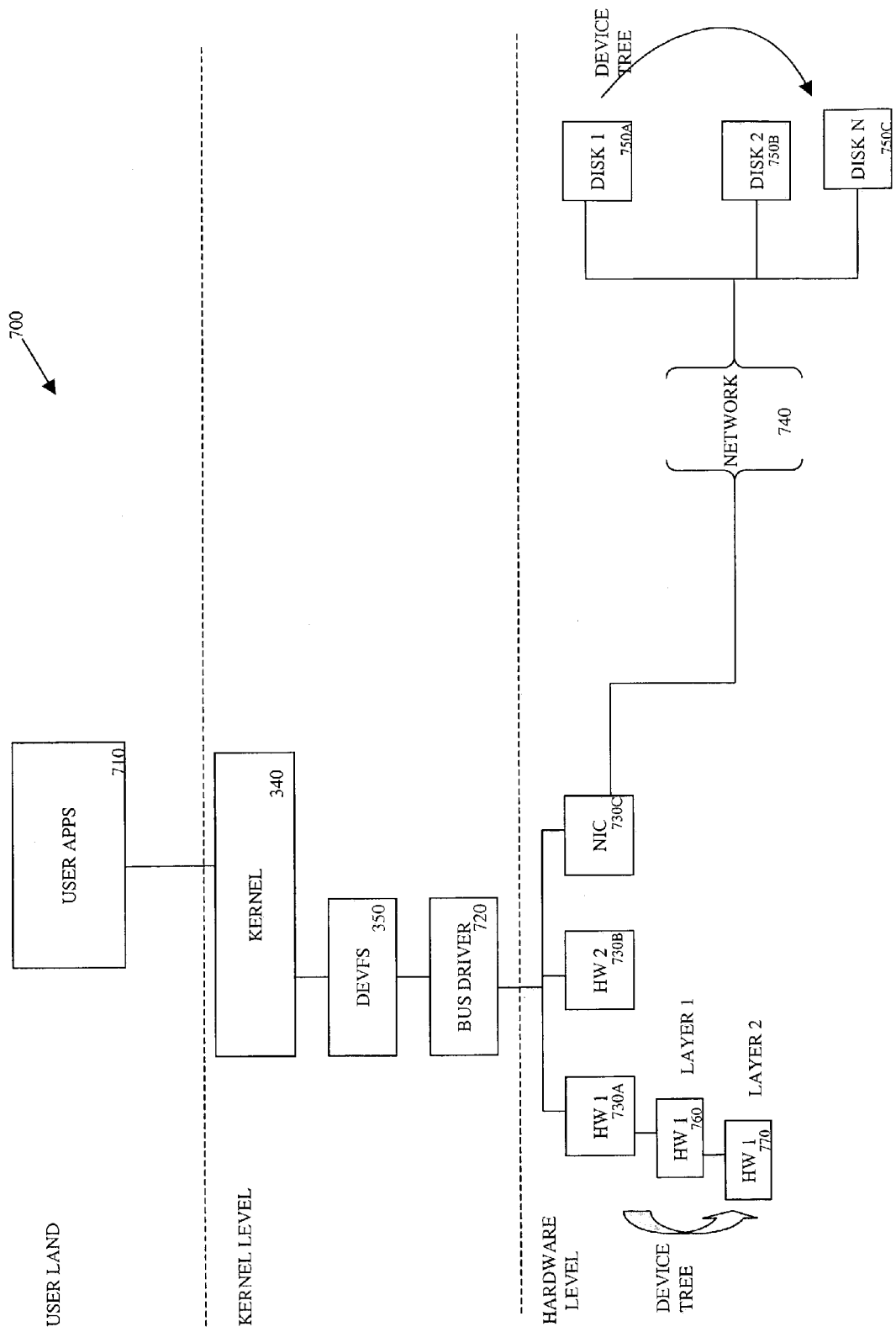
FIG. 7 is a block diagram of one embodiment of a device file-system tree of the kernel auto-configuration system of the present invention.

Reference is now made to FIG. 7 which is a block diagram illustration of one embodiment of a top-down device configuration environment 700 of the present invention. As depicted in FIG. 7, the device configuration environment 700 comprises user applications 710, kernel 340, the DEVFS 350, bus driver interface 720, hardware devices 730A–730C, network 740 and disk devices 750A–750C. A layer of devices also couple to the hardware devices 730A–730C. In one embodiment of the present invention, the disk devices 750A–750C and the layered devices 760 comprise an exemplary device tree. Each of the devices in the device tree may be configured using a physical path of the respective device. The kernel's top-down device configuration starts at the nexus driver 720 and drives configurations down the respective branches of the device tree. The DEVFS 350 serves as the interface between the kernel 340 and the bus driver interface to allow the kernel to query for a specific device, a class of devices, or all devices present on a bus.

The bus driver interface 720 may choose its own method of detecting a device, such as probing hardware registers, sending a bus request, or contacting a service over a network. Once a device is detected, the bus driver 720 may take a different action depending on the device class. If a new device is detected, the bus driver 720 typically creates a new device object. If a new path is detected to a device already known by the kernel 340, the bus driver 720 adds the new path to the device object.

In the device configuration environment 700 shown in FIG. 7, device enumeration is achieved through devices connected via new I/O busses. Devices with multiple I/O paths are treated the same way as devices with a single path. This simplifies the implementation of the kernel 340. When the bus driver 720 finds a device on the bus already known to the kernel 340, the bus driver 720 creates a new path to the device.

In the network environment illustrated in FIG. 7, when the kernel 340 invokes a bus configuration entry point of the nexus driver 720 to enumerate the immediate children of the driver 720, the entire device tree is enumerated.

As a device is opened via the /dev link, the system will follow the link content to the physical path name. As the DEVFS 350 looks up the path component after the /devices, it will detect the DEVFS 350 mount point and invoke the device lookup module 610. The device lookup module 610 implementation will ask the nexus driver to configure the next path component, starting from the rootnex. The nexus driver searches its children for a device information node named by the path component, and attaches the node if found. Enumeration of the entire device tree is recursively invoked at each layer of the device tree starting from the root node of the tree. The root node, with no parent, is created at system boot time and remains attached for the life of the kernel 340.

Figure 8:
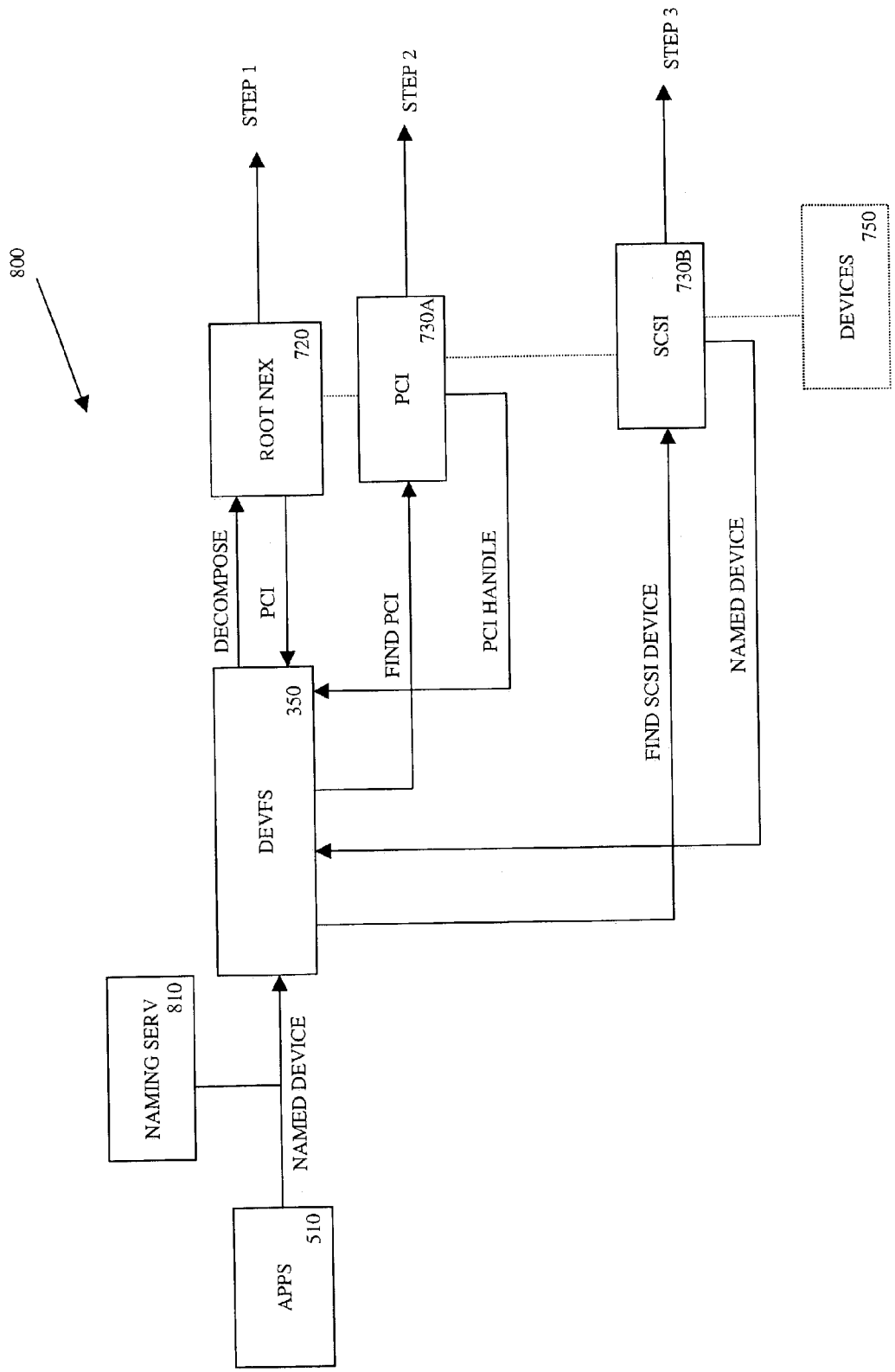
FIG. 8 is a flow diagram illustration of one embodiment of a device configuration and retrieval of the kernel device file-system of the present invention.

FIG. 8 is an exemplary computer controlled flow diagram of one embodiment of device auto-configuration and retrieval file system of the present invention. The DEVFS 350 hierarchically arranges device controllers (e.g., bus drivers and device controllers) and devices to allow for a recursive top-down access of devices in a network. As shown in FIG. 8, implementation of the kernel device file system is initiated by a computer system user application 510 requesting access a specific device by using the computer system's naming service 810. The specified device name is provided by the naming service 810 to the kernel DEVFS 350. In the example illustrated in FIG. 8, a device request looking up an IDE disk on a computer system with an exemplary path-name of /devices/pci@1f,0/pci@1,1/ide@3/dad@0,0:a)/device-name will result in the following search and retrieve steps.

At step 1, the DEVFS 350 lookups the pathname, decodes and decomposes the device name from the naming service 810 by presenting the named device to the root nexus 720 via bus_config_one. The rootnext configures pci@1f,0 (attachs pcipsy). In one embodiment of the present invention, the root nexus may be the bus driver 720 (e.g., /root). The root nexus returns the next level (in the case PCI) in the path hierarchy in response to the DEVFS 350 decomposition.

At step 2, the DEVFS 350 issues a bus_config_one to the PCIPSY driver which initiates a find PCI command on the bus 730A find PCI command to the PCI bus driver 730A. The PCIPSY driver configures the next node in the pathname as an instance of the SAMBA driver (e.g., pci@1,1). The PCI bus driver 730A returns a PCI handle to the DEVFS 350. The PCI handle provides the DEVFS 350 with the next level information of the device path-name.

At step 3, the DEVFS 350 issues bus_config_one to the SAMBA driver to configure an instance of the IDE driver as ide@3 and attaches the disk name (e.g., Uata). The IDE driver 730B returns information on the named device and the requested device is activated (if passively connected to the network) and made available to the applications 510.

After configuring the location of the IDE disk, the IDE disk (e.g., uata) configures dad@0,0 (and attaches "dad" and creates a minor node "a"). Finally, the DEVFS 350 lookup module 610 then creates a vnode with the device number from the minor node "a" and returns with the "dad" instance held. This completes the lookup of the pathname by DEVFS 350.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer system comprising:
 a processor;
 a memory storage unit;
 a system bus;
 a plurality of proprietary buses;
 an operating system comprising a kernel, said kernel comprising a kernel device file system monitoring and publishing system for detecting and publishing availability of a plurality of system level devices in said computer system;
 a plurality of subscribing user application programs communicatively only interfacing with said kernel device file system to subscribe to access said plurality of system level devices; and
 a device path decoding module for decoding device specific locations of said plurality of system level devices in said kernel device file system,
 wherein said kernel device file system logically defines said system level devices in a tree-like format to form a device tree, and said device tree includes a primary node corresponding to a bus driver that is coupled to said system bus, such that the kernel device file system provides an interface between the kernel and the bus driver,
 wherein said device tree includes a plurality of secondary nodes corresponding to proprietary peripheral bus drivers coupled to said plurality of proprietary buses, and said kernel device file system further comprises a device semantics locking module for allowing concurrent dynamic reconfiguration of different branches of said device tree.

2. The computer system of claim 1, wherein said device tree further comprises a plurality of tertiary nodes corresponding to said system level devices.

3. The computer system of claim 1, further comprising a device location notification module for responsively notifying said plurality of user application programs the location of a specified system level device.

4. The computer system of claim 3, further comprising a kernel device driver control module for monitoring said computer system to track a plurality of system bus drivers coupled to said computer system.

5. The computer system of claim 4, wherein said kernel device driver control module further monitors said computer system to track a plurality of proprietary peripheral device drivers coupled to said computer system.

6. The computer system of claim 5, further comprising a kernel device control module for tracking said system level devices coupled to said computer system.

7. The computer system of claim 6, wherein said kernel device file system comprises device nodes generated by said kernel for each of said system level device coupled to said computer system.

8. The computer system of claim 7, wherein each of said device nodes comprises a reference to a corresponding device information node in said device tree.

9. The computer system of claim 8, wherein said device node further comprises a reference count on said device information node to prevent said plurality of system level devices from being detached from said computer system.

10. The computer system of claim 1, wherein said kernel device file system further comprises a device node cache for caching said a plurality of device nodes in memory as long as said device nodes are being referenced in said device tree.

11. The computer system of claim 10, wherein said kernel device file system further comprises device lookup module for recursively searching said device tree to locate devices specified by said user applications programs.

12. The computer system of claim 11, wherein said kernel device file system further comprises device enumeration module for enumerating said device nodes in said device tree by recursively invoking a bus configuration command at each layer of said device tree to identify, enumerate and configure devices connected to the computer system.

13. The computer system of claim 12, wherein said kernel device file system further comprises device node addressing module for configuring device children nodes in said device tree.

14. A computer operating system comprising:
 a kernel comprising a plurality of subsystems;
 said plurality of subsystems comprising,
 a kernel device file system for monitoring and notifying user applications of available ones of a plurality of system level devices coupled to said computer operating system, wherein said kernel device file system defines a device tree comprising a nexus node device and layers of instances of said system level devices coupled to said computer system and the kernel device file system being an interface between the user applications and the system level devices;
 a kernel device driver control system for controlling a plurality of device drivers coupled to said computer operating system, wherein each of said plurality of device drivers couples to a specific plurality of said plurality of system level devices; and
 a kernel device control system for monitoring the addition and activation of said plurality of system level devices to said computer operating system;
 wherein said kernel device file system logically defines said plurality of system level devices in a tree-like format to form a device tree, and said device tree comprises a primary node corresponding to a bus driver coupled to a system bus,
 wherein said kernel device file system further comprises a device node generation module for generating device nodes corresponding to each of said plurality of system level devices, each of said device node comprising detailed specification information for each of said plurality of system level devices, and the detailed specification information being made available to the kernel device file system but not the kernel, as the kernel device file system is interfaced between the system level devices and the user applications, and said kernel device file system further comprises a device semantics locking module for allowing concurrent dynamic reconfiguration of different branches of said device tree.

15. The computer operating system of claim 14, wherein said device tree further comprises a plurality of secondary nodes corresponding to proprietary peripheral bus drivers coupled to a plurality of proprietary buses.

16. The computer operating system of claim 15, wherein said device tree further comprises a plurality of tertiary nodes corresponding to said plurality of system level devices.

17. The computer operating system of claim 14, further comprising a device location notification module for responsively notifying said plurality of user application programs the location of a specified system level device.

18. The computer operating system of claim 14, wherein said kernel device file system further comprises device enumeration logic for recursively identifying devices in said device tree coupled to said computer operating system.

19. The computer operating system of claim 18, wherein said kernel device file system further comprises a device node addressing logic for configuring lower level nodes of a nexus node.

20. The computer operating system of claim 19, wherein said kernel device file system further comprises a device unload logic for detaching devices accessed from said device tree.

21. In a computer system, a computer implemented kernel device file configuration and retrieval system comprising:
    kernel device detection logic for detecting system level devices by user application programs in the computer system, the kernel device detection logic only initiating detection of the system level devices upon receiving an application request for one of the system level devices by one of the user application programs;
    kernel device node generation logic for generating device nodes corresponding to devices actively coupled to said computer system in a tree-like format to form a device tree;
    kernel device notification logic for dispatching device data associated with said system level devices to said user application programs upon the activation of said system level devices in said computer system, and
    a device semantics locking module for allowing concurrent dynamic reconfiguration of different branches of said device tree.

22. The computer system as described in claim 21, wherein said kernel device node generation logic further comprises device enumeration logic for recursively enumerating nodes.

23. The computer system as described in claim 22, wherein said kernel device node generation logic comprises a device node generation module for generating device nodes corresponding to each of said plurality of system level devices, each of said device node comprising detailed specification information for each of said plurality of system level devices.

24. The computer system as described in claim 23, wherein said kernel device node generation logic also define errors occurring in device access in a kernel device file system.

25. A method of publishing available system kernel level devices of a computer operating system to user level applications, said method comprising:
    defining a set of kernel level devices for monitoring;
    defining a physical pathname of said kernel level devices coupled to said computer operating system;
    looking up said physical device pathname;
    locating a device from said kernel level devices based on said physical device pathname, the locating occurring in response to a request from at least one of the user level applications, such that a kernel of the computer operating system is isolated from directly locating the device from said kernel level devices;
    configuring a root nexus node of said physical device pathname to attach a succeeding node defining a device driver to said root nexus node in said physical device pathname;
    configuring a succeeding node defining a peripheral bus driver to said root nexus node in said physical device pathname; and
    configuring a succeeding node defining a parent device node to said root nexus node in said physical device pathname, the nodes defining a device tree, and
    executing a device semantics locking module for allowing concurrent dynamic reconfiguration of different branches of said device tree.

26. The method of claim 25, further comprising configuring a succeeding node defining a child device node to said root nexus node in said physical device pathname.

* * * * *